Patented June 17, 1952

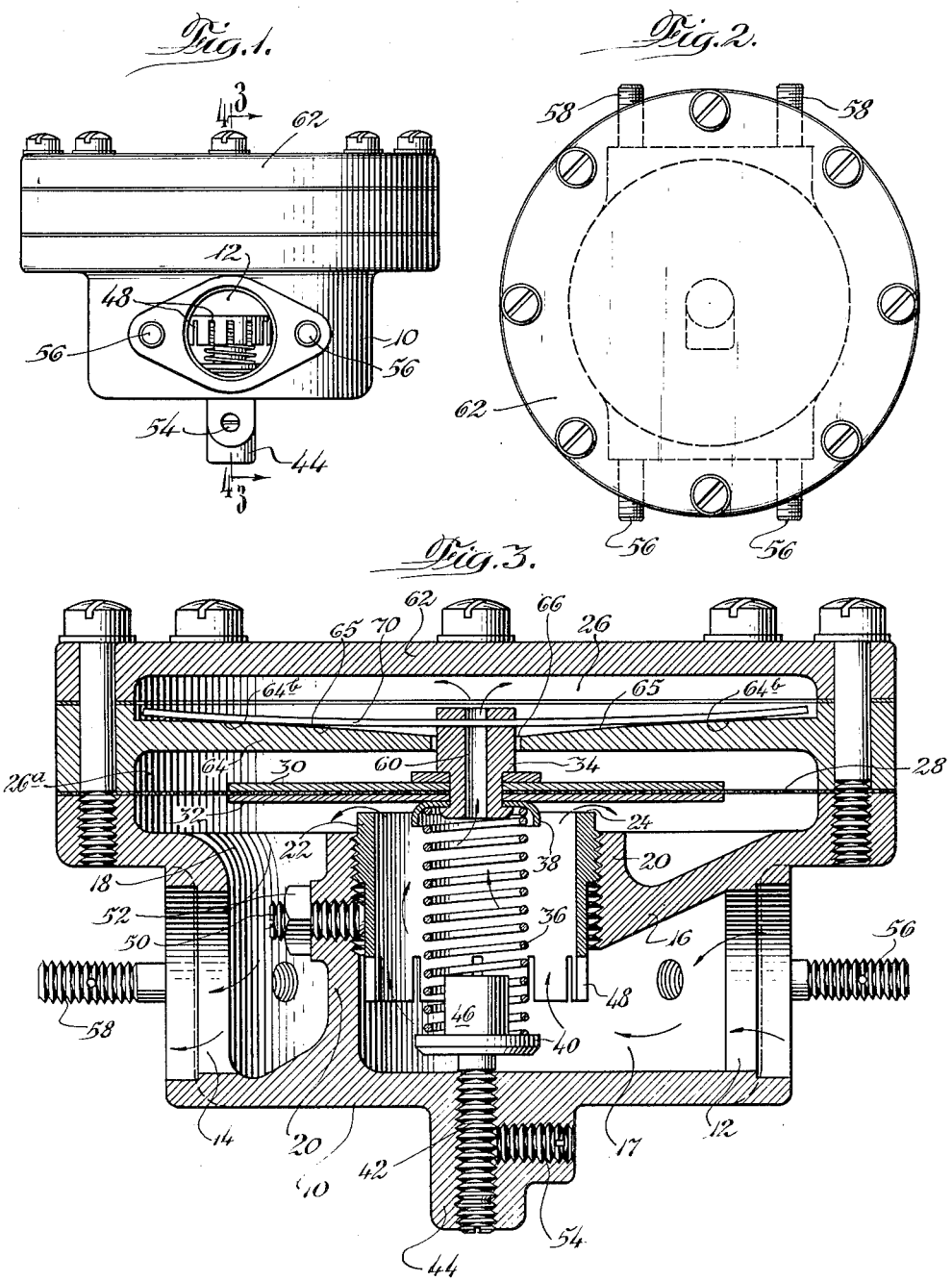

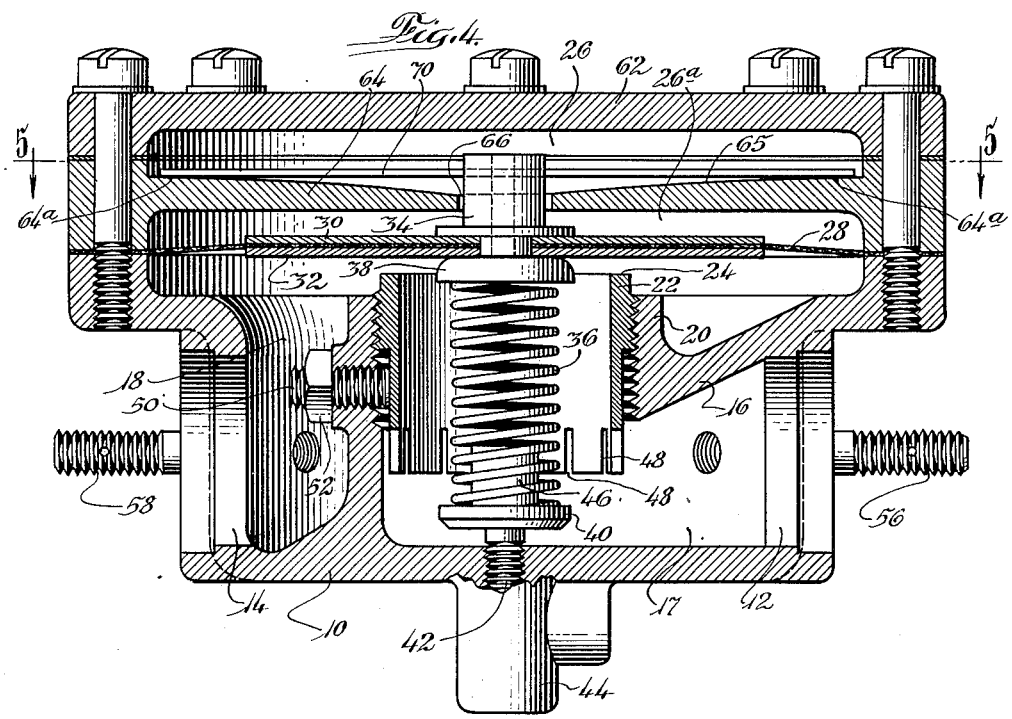
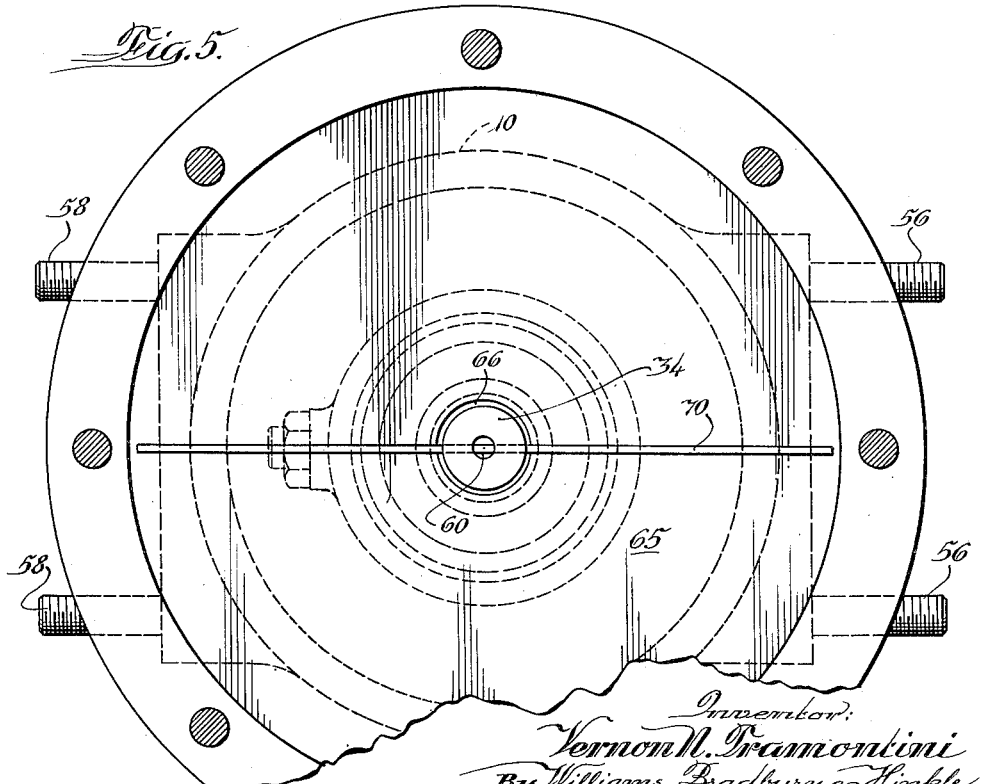

2,600,705

UNITED STATES PATENT OFFICE 2,600,705

CONTROL VALVE

Vernon N. Tramontini, Indianapolis, Ind., assignor to Stewart-Warner Corporation, Chicago, Ill., a corporation of Virginia Application February 14, 1946, Serial No. 647,597

5 Claims. (Cl. 50—14)

This invention relates to a valve device designed for controlling the flow of combustion air for use in an internal combustion heater, but as will be evident from the drawings and accompanying description, the utility of the valve is not limited to this particular field and reference to this use is made herein primarily by way of illustration.

One object of the invention is to provide a valve device which includes means for automatically regulating the flow of air through a conduit by adjusting the flow passage so as to deliver the air at a substantially constant pressure.

Another object of the invention is to provide an air flow regulating device having spring means operating to oppose the increase of pressure in the flow passage and arranged to increase its resistance progressively as with the increase in pressure of the air supplied to the device.

More specifically, the invention aims to provide an air pressure regulator through which air flows from an inlet to an outlet through a port having a valve seat and a valve normally spaced therefrom, together with a diaphragm subject on one side to the inlet pressure and on the other side to the outlet pressure and operable by the difference of these pressures to move the valve member toward or from the said seat so as to vary the capacity of the port and thus regulate the pressure of the air leaving the outlet.

It is a further object of the invention to provide in such a device a spring member of substantially uniform tension which determines the minimum differential pressure required to move the valve toward its seat, together with a supplementary spring also resisting movement of the valve in that direction and so mounted that it becomes progressively stiffer as the valve approaches its seat.

Other objects and advantages of the invention will appear from the following description taken in connection with the drawings, in which:

Fig. 1 is a side elevation of an air pressure regulator which includes a control valve embodying this invention;

Fig. 2 is a plan view of the device shown in Fig. 1;

Fig. 3 is a transverse sectional view taken substantially at the axis of the housing and as indicated at line 3—3 on Fig. 1 and showing the valve in a working position which it may assume when there is a flow of air through it;

Fig. 4 is a sectional view similar to Fig. 3 but showing the valve at its normal inactive position which it assumes when there is substantially no flow of air through the device;

Fig. 5 is a detail section taken as indicated at line 5—5 on Fig. 4.

In the operation of the heater for which the present control valve was particularly designed, air for combustion may be supplied by a blower, but in many installations of such heaters on airplanes this air is furnished by a ram in which the air pressure varies through a considerable range with changes in the air speed of the airplane. To protect the heater from these variations in pressure in the air supply, the control valve, which is the subject of this invention, is interposed in the air supply conduit and is designed to furnish air to the heater at a substantially constant pressure. The regulating mechanism is enclosed in a casing or housing 10 which is shown as of cylindrical form having an air inlet opening 12 at one side and an air outlet opening 14 at the opposite side. The housing 10 is divided by an oblique partition 16 to provide an air inlet chamber 17 and a valve chamber 18. This partition has a tubular boss 20 formed therein and threaded for adjustably supporting a tubular liner 22. The upper end 24 of the member 22 serves as an annular valve seat surrounding the port or passage through the part 22 which affords communication between the inlet 12 and the outlet 14.

In the housing 10 the valve chamber 18 is separated from a pressure chamber 26 by means of a flexible partition or diaphragm 28 disposed in a plane adjacent the valve seat 24. The central portion of the diaphragm 28 carries reinforcing plates 30 and 32 which are clamped to its opposite faces respectively by means of a central stem or rivet 34. The plate 32 is disposed opposite the valve seat 24 and serves as the valve therefor, but it is normally held out of contact with the seat and in spaced relation thereto by means of a coil spring 36 having one end seated around the rivet 34 in a flanged washer 38 which is secured against the plate 32 of the diaphragm assembly by the rivet 34. The opposite end of the spring 36 reacts against the flange or head 40 of an adjusting screw 42 threaded into a central boss 44 of the housing 10. The head 40 has a reduced portion 46 which extends within the coils of the spring 36 for centering the spring in relation to the head.

For convenience in adjusting it in the threaded boss 20 the tubular member 22 is provided at its lower end with a plurality of slots 48 which are accessible through the inlet opening 12 as seen in Fig. 1, and may be engaged by means of a screw driver or other convenient tool for rotating the part 22. A set screw 50 is threaded into the boss 20 for securing the member 22 at adjusted position and a lock nut 52 is provided for the screw 50. The screw 42, after adjusting the tension of the spring 46, also may be locked at adjusted position by means of its set screw 54 threaded into the boss 44. As shown, the housing 10 is provided with threaded studs 56 adjacent the outlet 12 and similar studs 58 adjacent the outlet 14 for connecting the housing with coupling flanges of the air conduit in which it is interposed.

The pressure chamber 26 communicates with the air inlet 12 and receives air therefrom by way of a passage 60 formed axially in the rivet or stem 34 carried by the diaphragm 28. The pressure chamber includes the upper space 26 just under the cover plate or top wall 62 of the housing 10, and also a lower space 26a adjacent the diaphragm 28. The pressure chamber is thus divided into two parts by an annular flange 64 extending inwardly from the side wall of the chamber and having a central opening 66 through which the stem 34 extends from the diaphragm 28. The annular clearance afforded by the opening 66 around the stem 34 provides constant communication between the upper portion 26 and the lower portion 26a of the pressure chamber so that the pressure of the air entering the inlet 12 is communicated by the passage 60 to the spaces 26 and 26a and is thus applied against the upper face of the diaphragm 28. The force of the spring 36 tends to uphold the diaphragm 28 in the position shown in Fig. 4 until the inlet pressure is sufficient to overcome this spring. The outlet 14 leading to a heater or other device in which the air is utilized or consumed will be subject to some back pressure, but as long as a flow of air is maintained from the inlet 12 to and through the outlet 14, it is evident that the relative pressure at the outlet 14 will be lower than that at the inlet 12. The differential between these two pressures is thus available against the diaphragm 28 and tends to move it in the direction for seating the valve plate 32 on the seat 24, but this tendency is resisted by the spring 36. The resistance of the spring may be adjusted by means of the screw 42 to determine the minimum value of the differential pressure which will tend to move the valve 32 toward its seat.

Since the strength of the coil spring 36 will not vary appreciably within the possible range of movement of the valve 32, this spring is supplemented by a spring member 70 which may be in the form of a heavy piano wire or similar straight bar which passes through a cross bore in the stem 34 and is thus attached at the middle of its length to the diaphragm 28. As seen in Fig. 4, the ends of the spring bar 70 rest initially on the outermost portions 64a of the upper surface 65 of the flange 64 so that the total length of the bar 70 is its effective length; but as the diaphragm 28 is moved downwardly by the differential air pressure, the spring bar 70 is deflected so that it bears upon portions 64b of the surface 65 somewhat nearer the center of the flange (as seen in Fig. 3), thus shortening the effective length of the spring bar 70 and increasing its resistance to the movement of the valve plate 32 toward its seat 24.

Thus when the increased velocity of the air supplied to the inlet 12 imposes an increased pressure upon the diaphragm 28, the valve 32 is moved toward its seat 24 to reduce the annular flow passage across this seat. This movement is retarded and ultimately checked by the spring 70 as its resistance increases with each increment of movement of the valve toward its seat 24, with the result that the reduced capacity of the flow passage over the annular valve seat 24 offsets the increase in velocity and inlet pressure, and the air continues to be delivered through the outlet at substantially the same pressure as before.

To insure this result it may be necessary to adjust the tubular liner 22 upwardly or downwardly in the threaded boss 20 and to make a corresponding adjustment in the screw 42 so as to raise or lower the initial position of the diaphragm 28 and shift the range of movement of said diaphragm relative to the spring bar 70 so that the progressive variation in the strength of the spring 70 shall be properly related to the position of the diaphragm 28 and valve plate 32 throughout their range of movement. As developed experimentally, the upper surface 65 of the flange 64 on which the spring bar 70 is supported is not a strictly conical surface but is slightly convex, being designed so as to vary the effective length of the spring member 70 at the required rate in relation to its deflection as caused by the movement of the diaphragm 28.

While there is shown and described herein certain structure illustrating the invention, it is to be understood that the invention is not limited thereto or thereby but may assume numerous other forms and includes all modifications, variations and equivalents coming within the scope of the following claims.

I claim:

1. An air pressure regulator comprising a housing which provides a valve chamber and a pressure chamber, a flexible wall between said chambers, the valve chamber having an air inlet and an air outlet with a partition between them, means forming a port through said partition with an annular valve seat at said port, valve means carried by said flexible wall, said valve means being disposed opposite said seat and normally spaced therefrom, said flexible wall having an opening which admits the inlet pressure to said pressure chamber whereby the differential pressure between the inlet and the outlet is applied to the flexible wall in a direction to seat the valve, and spring means opposing movement of the valve toward its seat including a spring exerting a substantially constant pressure on said valve, and other spring means for exerting a force on said valve increasing disproportionately as the valve approaches its seat.

2. An air pressure regulator comprising a housing which provides a valve chamber and a pressure chamber, a flexible diaphragm between said chambers, means forming an air inlet and an air outlet to said valve chamber, means forming a partition between said inlet and said outlet, said partition having an opening, a valve disk carried by said diaphragm, means for establishing communication between the inlet to said regulator and said pressure chamber whereby the differential pressure between the inlet and outlet is applied to the diaphragm in a direction to seat the valve, means for adjusting said regulator to vary the pressure of the air at the outlet thereof including an annular member establishing communication between said inlet and outlet adjustably secured in said opening in the partition for adjusting movement toward or from said valve disk and forming a seat for said disk, a coil spring disposed axially within the annular member with one of its ends bearing against the valve disc, means providing a seat for the opposite end of the coil spring having a stem threadedly adjustable in a wall of the housing for movement toward and from the valve disc for varying the force exerted by the spring, and a second spring means comprising a spring bar supported adjacent its opposite ends upon said housing and operatively connected intermediate its ends to said valve disc.

3. An air pressure regulator comprising a housing having a valve chamber and a pressure chamber defined therein, a flexible diaphragm between said chambers, the valve chamber having an air inlet and an air outlet with a partition therebetween, means forming a port through said partition with an annular valve seat at said port, a valve disk, a hollow rivet securing said valve disk to the diaphragm opposite the seat and normally spaced therefrom, said rivet having a stem projecting into said pressure chamber and providing a passage through said valve disk and diaphragm establishing communication between the inlet and the pressure chamber whereby the differential pressure between the inlet and the outlet is applied to the diaphragm in a direction to seat the valve, and spring means opposing movement of the valve toward its seat including a spring bar member disposed with its intermediate portion extending through a cross bore in said stem, said housing including supporting means having bearing surfaces for the end portions of said spring bar, said bearing surfaces being formed to contact the spring bar progressively nearer its midpoint as the bar is flexed and the valve approaches its seat.

4. An air pressure regulator comprising a housing having a valve chamber and a pressure chamber defined therein, a flexible diaphragm between said chambers, the valve chamber having an air inlet and an air outlet with a partition therebetween, means forming a port through said partition with an annular valve seat at said port, a valve disk, a hollow rivet securing said valve disk to the diaphragm opposite the seat and normally spaced therefrom, said rivet having a stem projecting into said pressure chamber and providing a passage through said valve disk and diaphragm establishing communication between the inlet and the pressure chamber whereby the differential pressure between the inlet and the outlet is applied to the diaphragm in a direction to seat the valve, an inwardly projecting annular flange on the portion of said housing defining said pressure chamber having an aperture extending therethrough of larger area than said stem, and spring means opposing movement of the valve toward its seat including a spring bar disposed with its intermediate portion extending through a cross bore in said stem, said flange on said housing having a convex surface on which the end portions of the bar rest, the points of contact of said end portions being shifted progressively nearer the midpoint of the bar as it is flexed by the movement of the valve toward its seat.

5. An air pressure regulator comprising a housing which provides a valve chamber and a pressure chamber, a flexible wall between said chambers, the valve chamber having an air inlet and an air outlet with a partition between them, means forming a port through said partition with an annular valve seat at said port, valve means carried by said flexible wall, said valve means being disposed opposite said seat and normally spaced therefrom, said flexible wall having an opening which admits the inlet pressure to said pressure chamber whereby the differential pressure between the inlet and the outlet is applied to the flexible wall in a direction to seat the valve, spring means opposing movement of the valve toward its seat including a spring exerting a constant pressure on said valve, and other spring means comprising a spring bar member, means connecting the middle portion of said bar to the valve, and supporting means carried by said housing and having bearing surfaces for the end portions of said bar, said bearing surfaces being formed to contact the bar progressively nearer its mid point as the bar is flexed and the valve approaches its seat.

VERNON N. TRAMONTINI.

REFERENCES CITED

The following references are of record in the file of this patent:

UNITED STATES PATENTS

| Number | Name | Date |
| --- | --- | --- |
| 942,112 | Sprecher | Dec. 7, 1909 |
| 1,807,200 | Dennison | May 26, 1931 |
| 2,172,678 | Heftler | Sept. 12, 1939 |
| 2,327,942 | Thoresen | Aug. 24, 1943 |
| 2,380,459 | Niesemann | July 31, 1945 |
| 2,407,345 | Reid | Sept. 10, 1946 |
| 2,409,070 | Ruby | Oct. 8, 1946 |